United States Patent [19]
Lynn

[11] Patent Number: 5,928,620
[45] Date of Patent: Jul. 27, 1999

[54] PROCESS EMPLOYING SINGLE-STAGE REACTOR FOR RECOVERING SULFUR FROM $H_2S$-BEARING GAS

[75] Inventor: Scott Lynn, Pleasant Hill, Calif.

[73] Assignee: The Regents of the University of California, Oakland, Calif.

[21] Appl. No.: 08/926,652

[22] Filed: Sep. 10, 1997

[51] Int. Cl.$^6$ .................................................. B01D 53/52
[52] U.S. Cl. .................. 423/574.1; 423/575; 423/242.1; 423/220
[58] Field of Search .............................. 423/574.1, 573.1, 423/576, 242.1, 242.2, 242.4, 242.6, 575, 220

[56] References Cited

U.S. PATENT DOCUMENTS

| | | | |
|---|---|---|---|
| 3,953,586 | 4/1976 | Tanimura | 423/575 |
| 4,124,685 | 11/1978 | Tarhan et al. | 423/574.2 |
| 4,795,620 | 1/1989 | Heisel et al. | 423/243 |
| 4,976,935 | 12/1990 | Lynn | 423/222 |
| 5,098,681 | 3/1992 | Christiansen et al. | 423/243 |
| 5,397,556 | 3/1995 | Towler | 423/220 |

OTHER PUBLICATIONS

M.P.Quinlan et al., "Technical and Economic Comparison of LO–CAT II with Other Iron–Based Liquid Redox Processes," GRI Liquid Redox Sulfur Recovery Conference, Austin, TX, (Oct. 4–6, 1992).

*Primary Examiner*—Gary P. Straub
*Assistant Examiner*—Timothy C Vanoy
*Attorney, Agent, or Firm*—Townsend and Townsend and Crew LLP

[57] ABSTRACT

Elemental sulfur is recovered from the hydrogen sulfide present in natural gas or other process gases by passing the hydrogen sulfide contaminated gas through a hydrogen sulfide absorber so as to obtain a natural or other process gas having a diminished amount of hydrogen sulfide and stripping the hydrogen sulfide out the resulting hydrogen sulfide rich solution so as to obtain a hydrogen sulfide rich gas; feeding the hydrogen sulfide rich gas and sulfur dioxide into a reactor so that the following reaction takes occurs, $2H_2S + SO_2 \rightarrow 3/2 S_2 + 2H_2O$ under such conditions that there is approximately a 50 percent stoichiometric excess of hydrogen sulfide; combusting the residual, unreacted hydrogen sulfide to convert it into sulfur dioxide, and passing the resulting sulfur dioxide back into the reactor where the reaction between hydrogen sulfide and sulfur dioxide occurs.

23 Claims, 4 Drawing Sheets

PROCESS EMPLOYING SINGLE-STAGE REACTOR FOR RECOVERING SULFUR FROM H₂S-BEARING GAS

BACKGROUND OF THE INVENTION

1. Field of the Invention

This invention lies in the field of sulfur removal and recovery, and particularly in the treatment of sour gases and other gases in the chemical process industry that contain hydrogen sulfide.

2. Description of the Prior Art

Much of the natural gas produced in the United States has a hydrogen sulfide content exceeding 4 parts per million and is therefore classified as "sour." Since hydrogen sulfide is an environmental hazard, sour natural gas is considered unacceptable for transport or use. Hydrogen sulfide levels are also a problem in the fabrication of fuels derived from petroleum, coal and lignite, whose sulfur content is converted to hydrogen sulfide during the conversion of these materials to gasoline, jet fuels, refinery gas, coal gas, blue-water gas and the like. In addition to the environmental hazard, hydrogen sulfide represents a loss of the sulfur value of the raw material, which if recovered as elemental sulfur would be of significant use to the chemical industry.

The traditional method for converting hydrogen sulfide in natural gases and in gaseous plant effluents is the Claus process, in which part of the hydrogen sulfide is burned in air to form sulfur dioxide and water:

$$2\ H_2S + 3\ O_2 \rightarrow 2\ SO_2 + 2\ H_2O \qquad (A)$$

and the sulfur dioxide thus produced is reacted with further hydrogen sulfide over an alumina catalyst to form sulfur and additional water:

$$2H_2S + SO_2 \rightarrow \frac{3}{2}S_2 + 2/H_2O \qquad (B)$$

The furnace (Reaction A) in the Claus process is operated with a fuel-rich mixture, converting only one-third of the H₂S to SO₂. The fuel-rich atmosphere results in the partial conversion of hydrocarbons that are present in the H₂S feed to such compounds as COS and CS₂, which lessen the yield of elemental sulfur and are themselves hazardous. The fuel-rich atmosphere also promotes the breakdown of aromatics to soot. For high sulfur recovery, precise control of the overall stoichiometry is needed, and this is made especially difficult when considerable amounts of CO₂ and other inerts are present.

Part of Reaction B occurs in the furnace and the rest is conducted in a heterogeneous system in which the reaction mixture is gas-phase and contacts a solid activated alumina catalyst of a sort well known to those skilled in the art of the Claus process. With continued use, the alumina catalyst fouls and becomes otherwise deactivated over time. This requires plant shutdown, loss of process time, and the cost of regeneration or replacement of the catalyst, together with the associated labor costs.

A further disadvantage of Reaction B is that it is equilibrium-limited at temperatures above the dewpoint of sulfur, and despite being performed in two to four stages, the reaction leaves 2% to 5% of the H₂S and SO₂ unreacted. Each stage requires a separate condenser to remove the elemental sulfur, and these condensers require a large heat-exchange area and reheating of the gas leaving each but the last condenser. Furthermore, the steam generated by each condenser is low in pressure, limiting its usefulness. Additional costs are entailed in treating the tail gas in which the sulfur content must be reduced by ten to twenty times.

SUMMARY OF THE INVENTION

It has now been discovered that virtually complete conversion of hydrogen sulfide in natural gas or other gas mixtures to elemental sulfur and water can be achieved with the use of a single-stage reaction between hydrogen sulfide and sulfur dioxide, in a manner producing no reaction products other than elemental sulfur and water. The reaction $$2H_2S + SO_2 \rightarrow \frac{3}{2}S_2 + 2H_2O \qquad (I)$$

is conducted with approximately 50% excess H₂S, and the SO₂ is supplied by combusting the unreacted H₂S in a furnace to form the SO₂ which is then recovered in a solvent and returned to the process.

Figure 1:
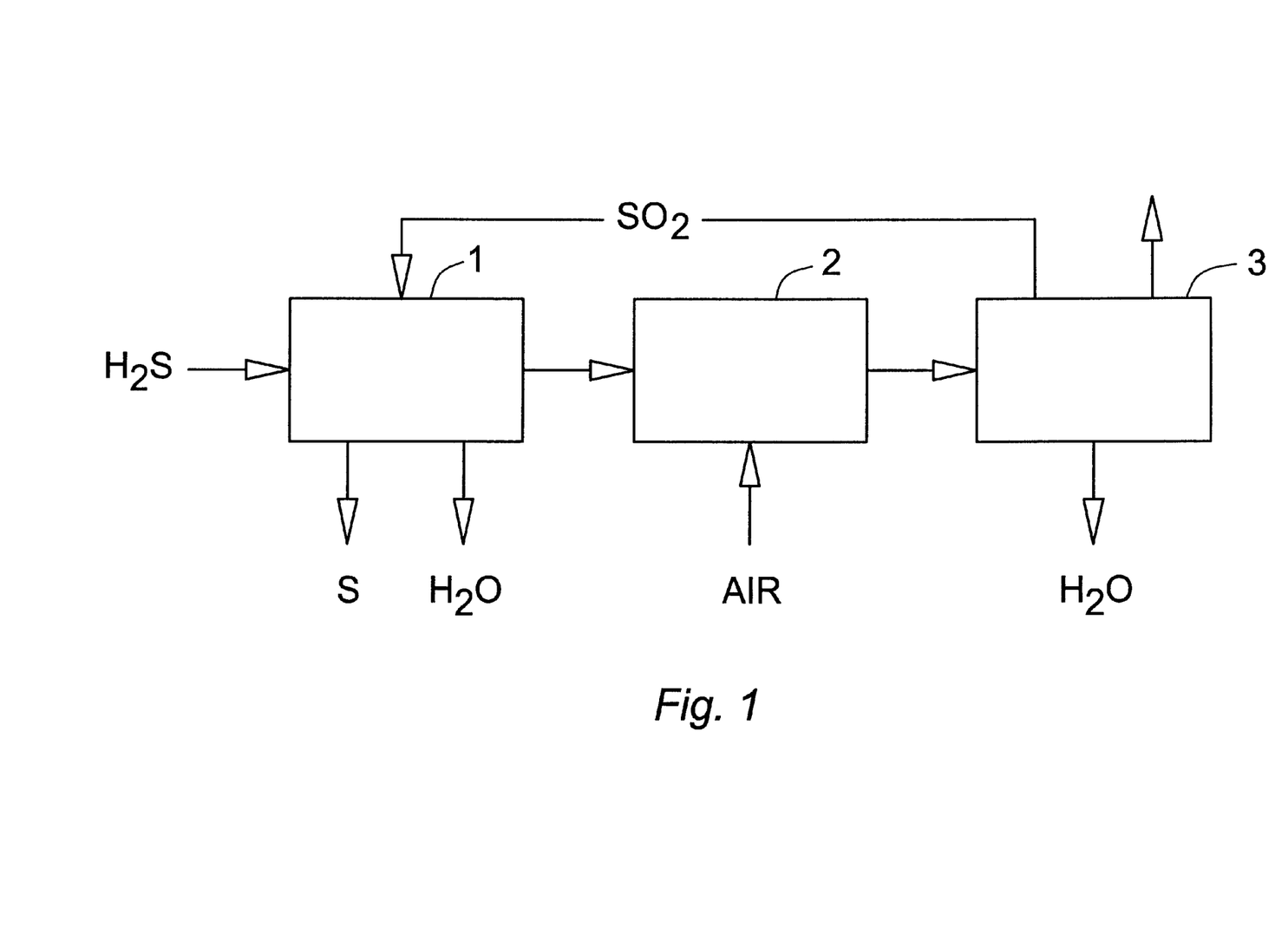
FIG. 1 is a block flow diagram illustrating the three primary stages of the process of this invention.

In basic terms, the invention as shown in FIG. 1 proceeds as follows:

(a) In a first stage, an H₂S-containing mixture is passed through a continuous-flow catalytic reactor where the mixture contacts SO₂ in accordance with the reaction $$2H_2S + SO_2 \rightarrow \frac{3}{2}S_2 + 2H_2O \qquad (I)$$

using approximately 50% excess H₂S. The H₂S enters the reactor either as a gas or dissolved in an organic solvent; in most cases the H₂S will enter as a gas. The SO₂ likewise enters the reactor either as a gas or dissolved in an organic solvent. With a gas-phase SO₂ feed, the H₂S preferably enters as a gas and the reaction is conducted over a conventional Claus catalyst. The product sulfur forms in the gas phase and the reaction causes a major fraction of the SO₂ to react. (The term "a major fraction" is used herein to indicate at least half, and preferably 80–90% or more.) When the SO₂ is fed as a liquid-phase solution, the solvent also contains a dissolved organic catalyst, and the reaction causes a substantially all of the SO₂ to be converted to elemental sulfur, leaving a gaseous reactor effluent containing most of the unreacted H₂S. The elemental sulfur formed in the liquid-phase SO₂ reaction system is either a liquid or a crystalline solid, depending on the temperature at which the reactor is operated. It is usually advantageous to operate the reactor above $T_{MS}$, the melting point of sulfur.

(b) In a second stage, the unreacted H₂S in the gaseous reactor effluent is combusted with oxygen according to the reaction $$3\ H_2S + 3\ O_2 \rightarrow 2\ SO_2 + 2\ H_2O \qquad (II)$$

to convert the H₂S to SO₂.

(c) In a third stage, the SO₂ produced in the second stage is recovered by absorption and returned to the reactor (the first stage). For a reactor using liquid-phase SO₂, the SO₂ in the third stage is recovered in the solution containing the dissolved catalyst, and the solution is recycled in its entirety to the continuous-flow reactor (the first stage) as the liquid-phase SO₂ feed to the reactor. For a reactor using gas-phase SO₂, the SO₂ in the third stage is recovered in liquid solution, then stripped out of the solution before being recycled to the first stage. In either case, a tail gas is produced that is substantially free of H₂S and SO₂.

Various additional process stages upstream, intermediate and downstream of these three stages are included in any of various arrangements in preferred embodiments of the invention to enhance the flow and transfer of streams, to separate phases and control concentrations and flow rates, to separate the water formed in Reactions I and II, and to control other process parameters such as temperature and pressure. These and other characteristics, features and advantages of the invention will be better understood from the description that follows.

DETAILED DESCRIPTION OF THE INVENTION AND PREFERRED EMBODIMENTS

Referring to FIG. 1, the continuous-flow reactor 1 described above serves as the first stage. In this stage, $H_2S$ contacts $SO_2$ in the presence of a catalyst that will promote the conversion of these reactants to elemental sulfur and water according to Reaction I. The reaction can occur either entirely in the gas phase, entirely in the liquid phase, or in mixed gas-liquid phases with $H_2S$ in the gas phase and $SO_2$ in the liquid phase. For reactions occurring entirely in the gas phase, a solid Claus-type catalyst can be used, such as activated alumina. For reactions occurring in either all-liquid or mixed gas-liquid phases, the liquid phase contains a dissolved catalyst.

When the $H_2S$ is fed as a gas, the concentration of $H_2S$ entering the reactor is not critical to this invention and can vary widely, but is preferably greater than the $H_2S$ concentration in a typical natural gas stream or process stream from a fossil-fuel treatment plant. The concentration is readily increased by selectively absorbing the $H_2S$ from the gas stream into a solvent, then stripping the $H_2S$ from the solvent. For mixed gas-phase and liquid-phase reactions, the solvent used to absorb the $H_2S$ from the feed gas can be the same solvent used in the continuous-flow reactor. Alternatively, a different solvent can be used in a separate flow loop. If the solvent is drawn from the reactor, the solvent will also contain water produced by Reaction I above, and the stripper will preferably volatilize the water from the solvent simultaneously with the stripping of the $H_2S$, and the emerging gas stream will contain both $H_2S$ and water vapor. In any event, in preferred embodiments, the $H_2S$-containing stream fed to the continuous-flow reactor 1 will be either partially or entirely in the gas phase, and will contain at least about 20 mole percent $H_2S$ and preferably from about 25 mole percent to substantially 100 mole percent $H_2S$. The $H_2S$-containing gas mixture prior to concentration is typically a sour gas whose $H_2S$ content can vary widely, ranging from as low as 0.01 mole percent to levels of 1.0 mole percent and above.

In embodiments where the $SO_2$ enters the continuous-flow reactor in a liquid phase, it is dissolved in the solvent that is used in the $SO_2$ absorber (identified above as the third stage) at a concentration of at least about 1% by weight, more preferably from about 1% to about 40% by weight, and most preferably from about 3% to about 10% by weight.

Any polar organic solvent that is of moderate to low viscosity, is chemically inert to $H_2S$, $SO_2$ and elemental sulfur, and that will dissolve $SO_2$ can be used. Preferred solvents are those that are of high miscibility with water and low miscibility with liquid sulfur, and most preferably those demonstrating little or no miscibility with sulfur. Preferred solvents are those that are derived from ethylene oxide or propylene oxide by a ring-opening reaction with a co-reactant having an active hydrogen, provided that the resulting solvent is inert with respect to both sulfur and $SO_2$. Examples are glycols and glycol ethers derived from ethylene oxide or propylene oxide, particularly ethers of ethylene glycol, diethylene glycol, triethylene glycol, tetraethylene glycol, propylene glycol, dipropylene glycol, tripropylene glycol, and tetrapropylene glycol. Specific examples are the monomethyl, dimethyl, monoethyl, and diethyl ethers of these glycols. The more preferred among these are the monomethyl and dimethyl ethers of diethylene glycol, triethylene glycol, propylene glycol, dipropylene glycol, and tripropylene glycol. The most preferred is diethylene glycol monomethyl ether (DGM).

For gas-phase reactions, the catalyst is a conventional solid-phase Claus catalyst, such as activated alumina. For reactions in which the $SO_2$ is in the liquid phase, the catalyst is one that is soluble in the solvent. Any soluble species known to be active catalysts for Reaction I can be used. Tertiary amines are preferred, particularly lower alkyl-substituted tertiary amines, lower alkyl- and aryl-substituted tertiary amines, and aryl-substituted tertiary amines, including those in which the amine nitrogen is an aromatic ring atom. Examples of useful tertiary amines that do not contain an aromatic ring nitrogen are N,N-dimethyl aniline, triethylamine, tri-n-butylamine, and mixed trialkylamines. Preferred liquid-phase catalysts are those that contain an aromatic ring nitrogen that is not sterically hindered by substitutions at carbon atoms adjacent to the ring nitrogen. For liquid-phase catalysts that are even more preferred, further features include a low solubility in liquid sulfur, a high solubility in water, and a low volatility. Preferred liquid-phase catalysts are pyridine and isoquinoline, optionally substituted at one or more sites other than carbon atoms adjacent to the ring nitrogen with a polar group. Examples of polar groups suitable as substituents are hydroxyl, hydroxyalkyl, acetamido, acetamidoalkyl, acetyl, acetylalkyl, acetyloxy, acetyloxyalkyl, alkoxy, alkoxyalkyl, amino, alkylamino, and aminoalkyl groups. The "alkyl" portions of these terms refers to lower alkyl, i.e., $C_1$–$C_6$ alkyl, straight- or branched-chain, provided that the alkyl group does not fully mask the polar character of the substituent. Preferred alkyl groups are $C_1$–$C_4$, particularly methyl and ethyl. Particularly preferred substituents are hydroxyl, hydroxymethyl, acetamido, acetamidomethyl, acetyl, acetylmethyl, acetyloxy, and acetyloxymethyl. The most preferred ring structure is pyridine, and the most preferred catalyst is 3-(hydroxymethyl)pyridine (3-pyridyl carbinol).

The concentration of liquid-phase catalyst in the solvent is not critical to the invention and can vary widely. For effective and economical results, a typical range of concentration is from about 0.1% to about 1.0% by weight, although concentrations above and below this amount can be used effectively as well.

The $H_2S$ entering the reactor 1 will frequently contain small-to-moderate concentrations of other gases such as $CO_2$, hydrocarbons, mercaptans, COS and $CS_2$. Such compounds are inert in the Stage 1 reaction, and will pass through the reactor 1 unchanged, together with the excess $H_2S$.

For reactions that utilize liquid-phase $SO_2$, flow of the $H_2S$ and the $SO_2$ through the reactor is preferably co-current, although counter-current flow can also be used. For co-current flow, the reactor is preferably a loosely packed bed of inert column packing designed for enhanced turbulent liquid-solid contact. Examples of column packings that can be used are Raschig rings, Lessing rings, Berl saddles, Intalox saddles, Tellerettes, Pall rings, and various designs of structured packing that are readily available in the industry. Residence time within the reactor is not critical and can vary widely but should be sufficient for $SO_2$ to react to extinction. In view of the 50% excess $H_2S$, this will typically be achieved with a liquid-phase residence time ranging from about 0.5 second to about 30 seconds, preferably from about 1 second to about 10 seconds, more preferably from about 1 second to about 5 seconds. In the particularly preferred practice of this invention, the liquid-phase residence time is from about 2 seconds to about 4 seconds. The temperature and pressure of the reaction are usually selected to produce elemental sulfur as a separate, clear yellow liquid phase. This is generally achieved with a temperature within the range of from about 115° C. to about 150° C., and most preferably with a temperature within the range of about 120° C. to about 140° C. It is then also preferred that at least some of the water produced by the reaction be volatilized in the reactor to leave the reactor as part of the off-gas. However, it is possible to operate the reactor below the melting point of sulfur if provision is made for handling the solid, crystalline product as it forms. Thus, the reactor must be operated as a crystallizer.

The furnace 2 described above as the second stage of the process of this invention combusts the unreacted (excess) hydrogen sulfide from the continuous-flow reactor with an oxygen-containing gas. Air is the most convenient, but other oxygen-containing gas mixtures (in which essentially all other components thereof are inert) or oxygen itself can be used. To avoid forming $SO_3$ and oxides of nitrogen ($NO_x$), or to minimize the formation of these gases, the furnace is preferably operated to result in little or no $O_2$ in the combustion gas leaving the furnace. This is accomplished by performing the combustion under conditions ranging from stoichiometric to slightly fuel-rich, i.e., the $H_2S$ entering the furnace should range from about stoichiometric relative to the oxygen in Reaction II above, to about a 5% excess. Gaseous components of the $H_2S$ feed such as hydrocarbons, mercaptans, COS, and $CS_2$ are burned completely under these conditions. Sulfur-containing compounds yield their sulfur as $SO_2$. When $CO_2$ is a component of the feed, it passes through the furnace unchanged and hinders the combustion only if its concentration is excessive.

The $SO_2$ absorber 3 is described above as the third stage of the process of the invention. The absorbing solvent, which also contains the catalyst and is used as the carrier to transport the $SO_2$ to the reactor, is preferably recovered from the product stream leaving the reactor itself, and stripped of substantially all water and dissolved $H_2S$ prior to the entry of the solvent into the absorber. The solubility of $SO_2$ is very high in the solvents preferred for this process, which allows the absorption of substantially all of the $SO_2$ from the combustion gas. The $SO_2$ in the tail gas leaving the absorber can be reduced to 10–100 parts per million (ppm) (by volume), well below current emission limits. The solubility of $CO_2$ in these solvents is relatively low and the amount of $CO_2$ absorbed from the combustion gas is insignificant.

The tail gas is thus substantially free of $H_2S$ and $SO_2$. The term "substantially free" is used in this context to include trace amounts of each gas, such as amounts in the range of approximately 10–100 ppm or less for $SO_2$ and approximately 0.01–1.0 ppm or less for $H_2S$.

Figure 2:
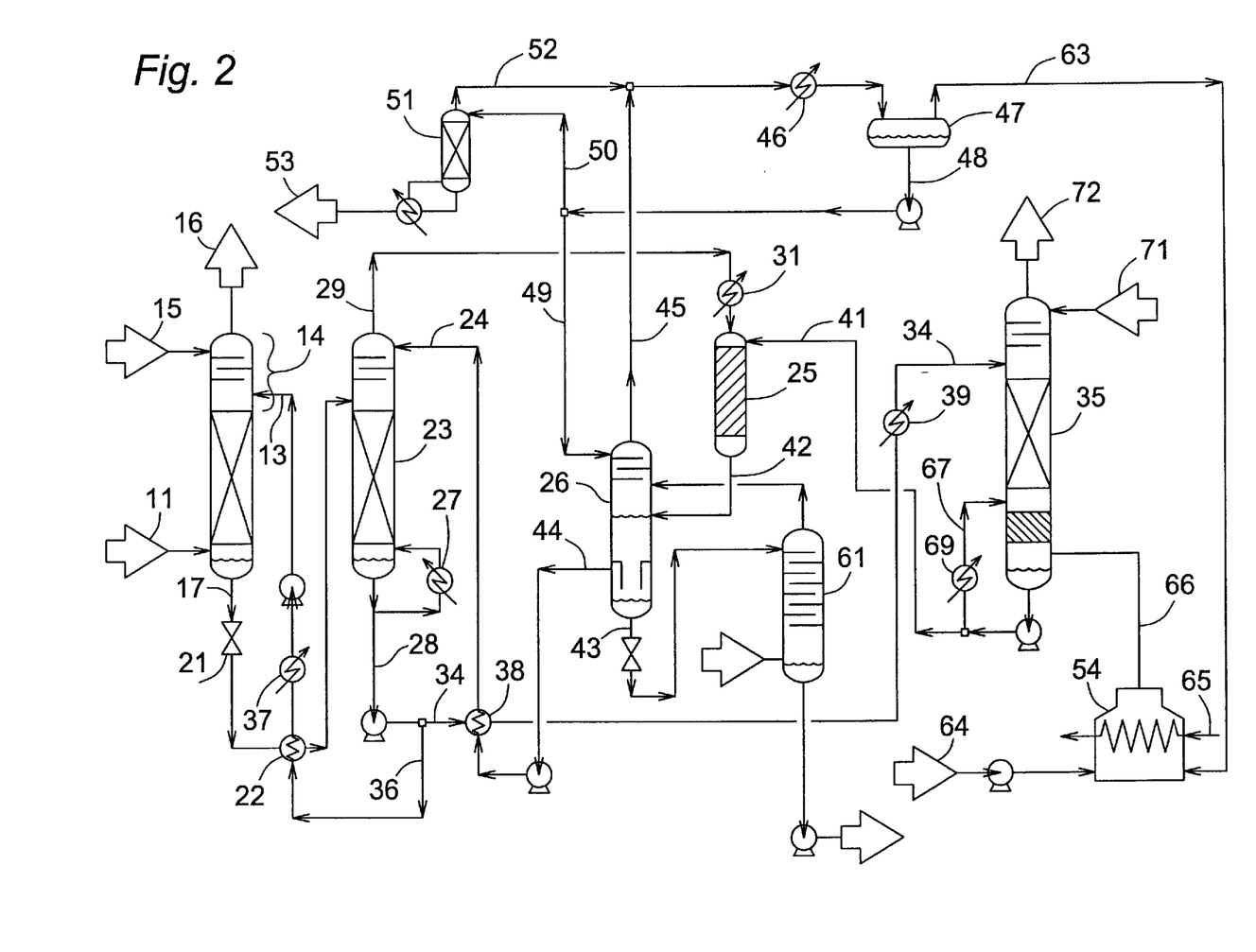
FIG. 2 is a process-flow diagram illustrating an embodiment of the invention in which the first-stage reaction occurs in a mixed liquid-phase and gas-phase medium. The feed gas in this embodiment is a high-pressure sour natural gas stream or other $H_2S$-containing stream having a relatively high content of $H_2S$ and a relatively low content of hydrocarbons with 5 or more carbon atoms. The $SO_2$ is fed to the reactor as a solution in an organic solvent that also contains a dissolved catalyst.
Figure 3:
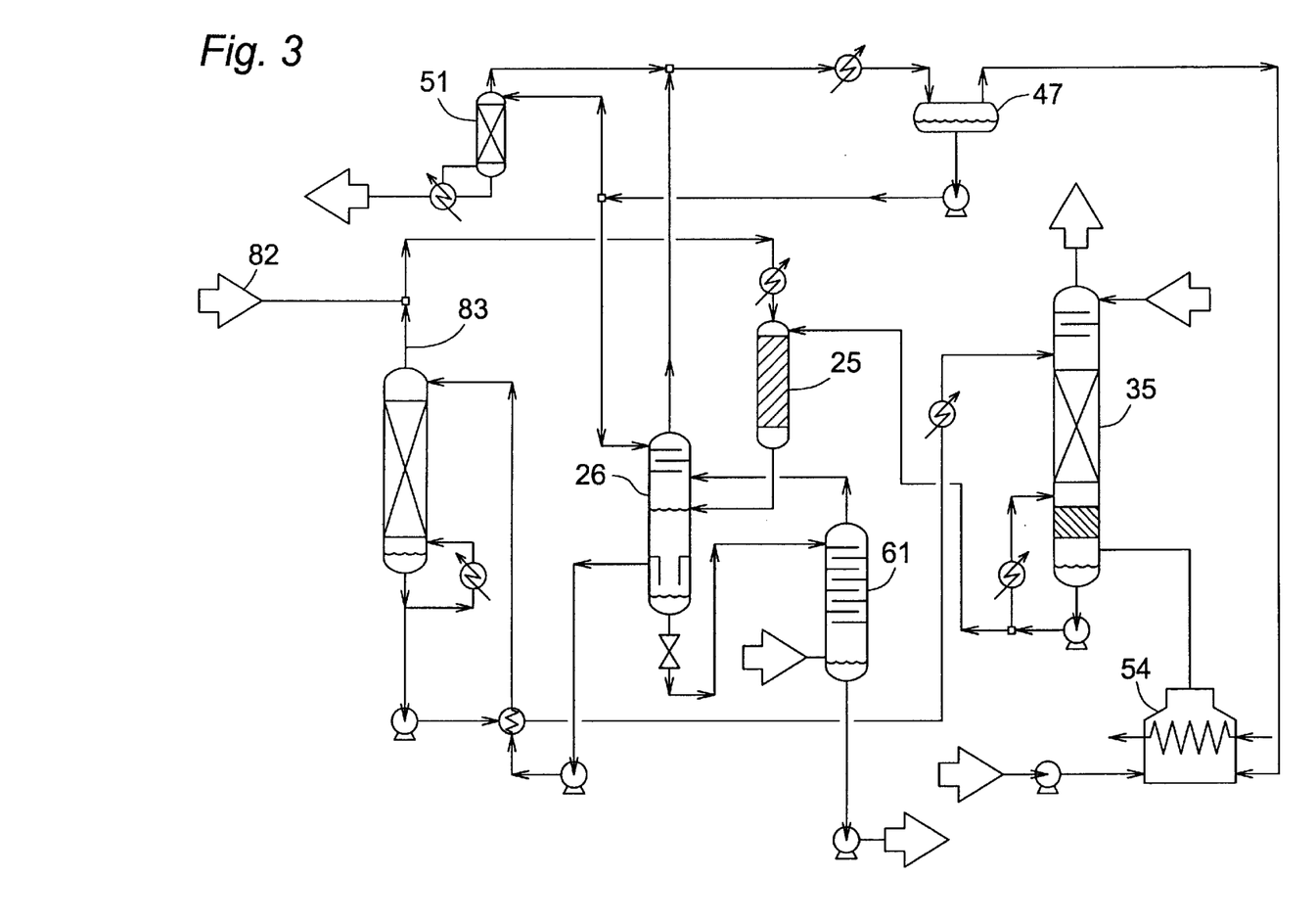
FIG. 3 is a process-flow diagram illustrating an additional embodiment of the invention in which the first-stage reaction occurs in mixed liquid and gas phases. The feed gas in this embodiment is an $H_2S$-containing gas stream typical of an alkanolamine absorber/stripper operation that recovers $H_2S$ from a process gas. As in the embodiment of FIG. 2, the $SO_2$ is fed to the reactor as a solution in an organic solvent that also contains a dissolved catalyst.
Figure 4:
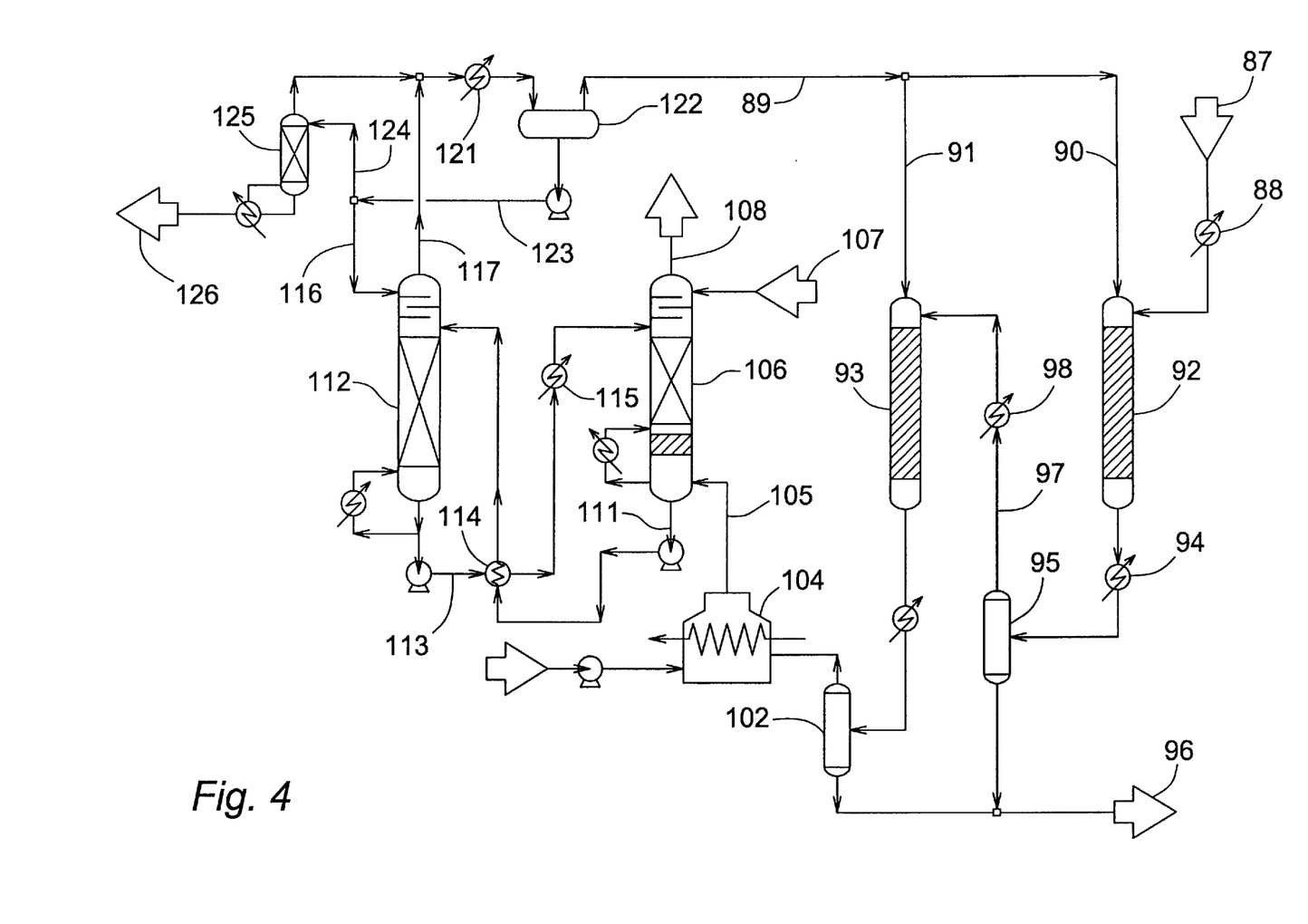
FIG. 4 is a process-flow diagram illustrating an embodiment of the invention in which the $SO_2$ is stripped from the organic solvent used in the third-stage absorber and is fed to the reactor as a gas. The first-stage reaction is thus conducted entirely in the gas phase using a solid catalyst for Reaction I.

FIGS. 2, 3 and 4 are more detailed process-flow diagrams for particular sulfur recovery processes within the scope of the invention.

FIG. 2 is a process-flow diagram for a plant designed for a reaction using liquid-phase $SO_2$ and a liquid-phase catalyst, with a feed of sour natural gas 11 at 1,000 pounds per square inch absolute (psia) (68 atmospheres) containing 2.7 mole percent $H_2S$ and 0.1 mole percent $H_2O$. The sour gas is first passed through an absorber 12 in upward flow, the absorber being a packed tower with counter-current flow of gas and liquid. The solvent 13 with dissolved catalyst enters the top of the absorber 12 at about 40° C. (104° F.) at a rate of about 3 kg per 100 moles of feed gas, or about 1.5 times the minimum flow required for absorption of the $H_2S$ in the feed gas. Using diethylene glycol monomethyl ether (DGM) as the solvent, the gas stream rising past the packed section of the absorber 12 (still within the absorber) is equilibrated with water present in the incoming solvent stream 13 and contains about 10 ppm (by volume) of DGM. In the portion 14 of the absorber above the packed bed, a small stream of water 15 is introduced to absorb remaining solvent and prevent loss of the solvent into the sweet ($H_2S$-free) gas 16 leaving the top of the absorber.

The $H_2S$-rich solvent 17 leaving the absorber contains almost all of the $H_2S$ and $H_2O$ in the sour gas feed. The $H_2S$-rich solvent passes through a valve 21 where its pressure is dropped to near atmospheric, then preheated in a heat exchanger 22 prior to entering the solvent stripper 23 as a side stream. Entering the top of the solvent stripper 23 is a stream of wet solvent 24 which also contains a small amount of $H_2S$. The stream of wet solvent 24 is the liquid effluent from the continuous-flow reactor 25 (discussed below), after separation from the unreacted $H_2S$, water vapor and liquid sulfur that are produced in the reactor 25, the separation having been performed in a gas-liquid-liquid separator 26 (discussed below). The wet solvent stream 24 contains the solvent and catalyst used in that reactor plus water and a small amount of dissolved $H_2S$, the wet solvent having been separated from the gas and liquid sulfur in the gas-liquid-liquid separator 26.

The solvent stripper 23 operates at a pressure slightly above atmospheric and is heated by a reboiler 27. The lean solvent 28 emerging as the stripper bottoms is substantially free of $H_2S$ and entirely free of $SO_2$, and contains about 1% water (by weight) at a temperature of about 170° C. (338°

F.). The vapor stream 29 leaving the solvent stripper contains the $H_2S$, water, hydrocarbons, and other components that have been absorbed from the sour feed gas 11, plus the water and $H_2S$ returned from the gas-liquid-liquid separator 26. This vapor steam, which contains about 2.5 moles of water vapor per mole of $H_2S$, is directed through a partial condenser 31 to the reactor 25.

The heat input to the reboiler 27 is about 102 kcal per mole of $H_2S$ in the feed gas. The stripping factor for water from the DGM solvent, $K_{water}V/L$, is 7 or higher. Only four theoretical stages are needed to reduce the $H_2O$ content of the solvent to 1% and to strip 99.99% (all by weight) of the $H_2S$ from the solvent.

The lean solvent 28 emerging from the bottom of the solvent stripper 23 is split into two fractions, one 34 directed to the $SO_2$ absorber 35 (discussed below) and the other 36 directed to the $H_2S$ absorber 12. The latter fraction 36 heats the $H_2S$-rich solvent 17 in the heat exchanger 22 between the $H_2S$ absorber 12 and the solvent stripper 23 and is then cooled further with cooling water to about 40° C. (104° F.) in a heat exchanger 37. The former fraction 34 passes through a heat exchanger 38 where it preheats the liquid stream emerging from the gas-liquid-liquid separator 26 before that stream enters the solvent stripper 23. The lean solvent in this fraction is further cooled with cooling water to about 40° C. (104° F.) in a heat exchanger 39 prior to entering the $SO_2$ absorber 35.

The vapor stream 29 (off-gas) from the solvent stripper 23 contains about 2.5 moles of $H_2O$ per mole of $H_2S$. About one-third of the water vapor condenses in the partial condenser 31, and the entire stream, including both condensate and gas, enters the top of the reactor 25. Also entering at the top of the reactor is $SO_2$-rich solvent 41 (plus dissolved catalyst) at a temperature of about 45° C. (113° F.), and the two flow cocurrently downward through a packed bed. As an example, the flow rate of solvent 41 may be 0.33 kg per mole of $H_2S$ in the sour gas feed 11. The reactor itself may have an active volume measuring about 0.075 times the hourly volumetric flow rate of solvent, and may be packed with one-half inch (1.3 cm) Pall rings. The temperature close to the point of entry in the reactor is about 115° C. (239° F.), and the temperature of the mixed-phase product stream 42 leaving the reactor is controlled at 120–140° C.

The mixed-phase product stream 42 is directed to the gas-liquid-liquid separator 26, where (i) the liquid sulfur 43, (ii) the water-, $H_2S$- and catalyst-containing solvent 44, and (iii) the $H_2S$- and water-containing gas 45 are separated into three separate streams.

The H12S- and water-containing gas stream 45 is passed through a cold-water condenser 46 to a gas-liquid separator 47. The liquid stream 48 drawn from the separator is split into two streams 49, 50. One of these streams 49 is returned to the top of the gas-liquid-liquid separator 26 to absorb additional solvent vapor and thereby prevent loss of the solvent. This added water also serves to reduce the solubility of the liquid sulfur in the solvent in the separator 26. The water is then separated from the solvent in the solvent stripper 23. With the sulfur content thus lowered (or eliminated), the lean solvent 28 can be cooled to 40° C. (104° F.) by the heat exchangers shown, without depositing solid sulfur on the heat-exchange surfaces. The amount of water required to achieve this result is presently believed to be about 7.5 moles/kg of DGM. This amounts to about 0.33 moles of water per mole of $H_2S$ in the sour feed gas 11.

The second stream 50 is fed to a small $H_2S$/water stripper 51 where the $H_2S$ is driven off as a gas 52 from the water 53.

The remaining water 53 represents the net flow of water absorbed from the feed gas plus the water formed by reaction in both the reactor 25 and the furnace 54 (discussed below). The $H_2S$ 52 thus driven off is passed again through the gas-liquid separator 47.

The liquid sulfur stream 43 produced in the reactor 25 and separated in the gas-liquid separator 26 is fed to a dry-steam stripper 61 to recover any $H_2S$ and solvent 62 that are present in the sulfur and to return them to the gas-liquid-liquid separator 26. The amount of sulfur produced is 0.9999+moles per mole of $H_2S$ in the sour gas feed 11.

The gas stream 63 leaving the gas-liquid separator 47 is fed directly to the furnace 54 where the gas stream is combusted with atmospheric air 64. In the fuel-rich mixture in the furnace 54, the $H_2S$ is converted to $SO_2$, and the sulfur content of mercaptans, COS and other sulfur-containing compounds also converts to $SO_2$. Hydrocarbons and other organics are burned to $CO_2$ and $H_2O$. Because of the high concentration of $SO_2$ in the combustion gas, no $H_2$, CO, COS, $CS_2$ or soot will form. Some $S_2$ will form and some $H_2S$ will remain, and the combustion air flow rate 64 will preferably be adjusted to control the atomic sulfur content of the unreacted $H_2S$ and $S_2$ vapor to a range of about 2000 to about 3000 parts per million (by volume).

The combustion of the $H_2S$ will yield 118 kcal/mole at 95% efficiency. This energy generation rate is slightly above the amount needed to operate the solvent stripper 23. The energy is collected by generating steam from boiler feed water 65 that is fed through the furnace. The steam can be used in the reboiler 27 at the base of the stripper 23. Adding further to the energy generated in the furnace is the combustion of organics present in the stripper off-gas 45, which are carried through the gas-liquid separator 47 to the furnace together with the $H_2S$.

The combustion gas 66 leaving the furnace contains one mole each of $SO_2$ and $H_2O$ and six moles of nitrogen gas per mole of $H_2S$ gas entering the furnace. The combustion gas 66 is directed to the $SO_2$ absorber 35, where it is absorbed in counter-current flow by the lean solvent 34 (which is substantially free of $H_2S$ and entirely free of $SO_2$). With DGM as the solvent, the heats of solution of $SO_2$ and $H_2O$ are about 9 kcal/mole and 10 kcal/mole, respectively, which would produce a temperature rise of about 32° C. in the DGM for an outlet concentration of one mole of $SO_2$ per kg of DGM. The sensible heat of the furnace gas, together with water of combustion from any hydrocarbons would further contribute to the temperature rise. To control the temperature and to minimize the net flow of solvent through the absorber, a quench stream 67 is drawn from the $SO_2$-bearing solvent 68 emerging from the bottom of the absorber, cooled 69 and recycled to the absorber. As in the $H_2S$ absorber, a small stream of water 71 is introduced into the top of the $SO_2$ absorber 35 above the introduction point of the lean solvent 34, to reduce the solvent content of the stack gas 72.

FIG. 3 depicts a variation of the process flow diagram of FIG. 2, designed for sour feed gases that are predominately $H_2S$. Such feed gases are typical of the off-gas from an alkanolamine (or activated potassium carbonate) absorber/stripper operation used to remove $H_2S$ and other acid gases from a process gas stream, although the $H_2S$-rich feed gas may be from other sources as well. The feed gas may also contain $CO_2$, hydrocarbons, mercaptans, COS, etc., but the fraction of $H_2S$ will typically exceed 50% and can approach 100%. All components and flows in this example are the same as in the corresponding parts of FIG. 2, except for the solvent stripper 81, which now serves only to separate the water and dissolved H$_2$S in the solvent leaving the gas-liquid-liquid separator 26.

The absorber/stripper referred to in the preceding paragraph is not shown in FIG. 3, but is of conventional construction and operation. The amine solvent used in the absorber portion of the absorber/stripper is preferably an aqueous solution of an alkanolamine, a dialkanolamine, or an alkali metal carbonate. Preferred among the alkanolamines and dialkanolamines are (C$_1$–C$_4$ alkanol)-amines and di-(C$_1$–C$_4$ alkanol)-amines, examples of which are monoethanolamine, diethanolamine, methyldiethanolamine, diglycolamine, propanolamine and isopropanolamine. Preferred among the alkali metal carbonates is potassium carbonate. The H$_2$S is then stripped from the solvent by conventional means.

FIG. 4 is a process-flow diagram of a process designed for feeding both gas-phase H$_2$S and gas-phase SO$_2$ to a two-reactor system containing a solid catalyst such as alumina that effectively catalyzes Reaction I. The H$_2$S-rich feed 87 is similar to that in FIG. 3, and is preheated (either by steam 88 as shown or by partial combustion) so that when the H$_2$S feed enters the two-reactor system and mixes with the SO$_2$, the temperature of the mixture will exceed the activation temperature of the catalyst, which is typically about 180° C. The SO$_2$ stream 89 is split into two streams 90, 91, one directed to each of the two reactors 92, 93. Between the two reactors 92, 93 is a cooler 94 (fed by boiler feed water to produce steam, for example) to lower the temperature of the gas mixture to a temperature at which sulfur condenses (i.e., a temperature between the dewpoint of sulfur and the melting point of sulfur). The cooled stream enters a gas-liquid separator 95 where liquid sulfur 96 is separated out. The remaining vapors 97 are reheated 98 before entering the second reactor 93 where they are combined with a fresh stream 91 of SO$_2$. Although two reaction stages 92, 93 are shown in this diagram, the process can also be operated with only one stage or with three or more. Preferably, the stages range from two to ten in number, and most preferably three to six. As an alternative to the arrangement shown, the reaction stages can be combined in a single reactor with cooling coils between stages to cool the gas mixture to a temperature just above (i.e., within about 5 degrees Celsius) the dewpoint of sulfur. Sulfur will not be condensed between the stages in this arrangement, which will thereby eliminate the need for reheating the gas between stages. These and other variations will be readily apparent to those skilled in the art of reactor engineering and are within the scope of this invention.

At the outlet of the second reactor 93, the gas mixture passes through a condenser 101 (again possibly fed by boiler feed water to produce steam), and liquid sulfur is then collected in a gas-liquid separator 102. Liquid sulfur 103 is drawn off, and the unreacted H$_2$S then flows to a furnace 104, where it is burned with stoichiometric air as in the process flow diagrams of FIGS. 2 and 3. The SO$_2$-rich combustion gas 105 from the furnace 104 flows to an SO$_2$ absorber 106, where the SO$_2$ and the water vapor are absorbed by an inert organic solvent as in FIGS. 2 and 3. Also as in FIGS. 2 and 3, a small stream of water 107 is introduced at the top of the absorber to absorb solvent vapor. The stack gas 108 leaving the absorber 106 is substantially free of SO$_2$ and H$_2$S.

The wet SO$_2$-rich solvent 111 leaving the SO$_2$ absorber 106 enters the solvent stripper 112, where both the SO$_2$ and the water absorbed from the combustion gas 105 are substantially stripped. As in the H$_2$S strippers of FIGS. 2 and 3, only four theoretical stages are required for 99.99% recovery of the SO$_2$ in the solvent stream 111. The lean solvent stream 113 emerging from the stripper 112 is then cooled by heat exchange 114 with the feed 111 to the stripper, and then by cooling water 115. Here as well, a small water stream 116 introduced at the top of the stripper 112 prevents loss of solvent vapor in the vapor steam 117.

The vapor stream 117 contains the SO$_2$ formed in the furnace 104 and the water vapor formed both in the reactors 92 and 93 by Reaction I and in the furnace 104 by Reaction II. The water vapor is separated from the SO$_2$ when the vapor stream 117 flows through a condenser 121 and a gas-liquid separator 122. The gas stream 89 emerging from the gas-liquid separator recycles the SO$_2$ to the reactors 92 and 93. The liquid 123 emerging from the gas-liquid separator is divided into two streams, one of which 116 forms the small water stream introduced at the top of the solvent stripper 112, while the other 124 is directed to a stripper 125, where dissolved SO$_2$ is removed and returned to the system, leaving S)$_2$-free water 126 for discharge.

Because of their higher temperature of operation, the reactors 92 and 93 in the process-flow diagram of FIG. 4 do not effect complete reaction of the SO$_2$ that passes through them. The small amount of the SO$_2$ that is unreacted is recycled along with the SO$_2$ formed in the furnace 104. However, as was the case in the processes of FIGS. 2, and 3, this recycle is self-regulating and the process is stable and readily controllable.

All units and unit operations, including strippers, absorbers, packed columns, separators, heat exchangers, and associated pumps and valves are of conventional construction from conventional materials whose choice will be readily apparent to the skilled chemical process engineer, particularly one with skill in the treatment of sour gas streams.

The foregoing is offered primarily for purposes of illustration. It will be readily apparent to those skilled in the art that the process flow schemes, relative flow rates, stream compositions, operating conditions, and other parameters of the process described herein may be further modified or substituted in various ways without departing from the spirit and scope of the invention.

I claim:

1. A process for treating a gas mixture containing H$_2$S to convert said H$_2$S to elemental sulfur, said process comprising:

(a) feeding a sour gas mixture containing H$_2$S through an H$_2$S absorber to absorb H$_2$S from said sour gas mixture to form an H$_2$S-rich solution and passing the H$_2$S-rich solution through a solvent stripper to draw therefrom a gas containing at least about 20 mole percent H$_2$S;

(b) feeding said gas containing at least about 20 mole percent H$_2$S to a continuous-flow reactor and contacting O$_2$ gas in said reactor with SO$_2$ at relative feed rates of approximately 50% excess H$_2$S relative to SO$_2$ in accordance with the reaction $$2H_2S + SO_2 \rightarrow \frac{3}{2}S_2 + 2H_2O \qquad (I)$$

in the presence of a catalyst for said reaction, under conditions that maintain the temperature between about 115° C. and about 150° C. and that cause a major fraction of said SO$_2$ to convert to elemental sulfur and that produce a gaseous reactor effluent containing unreacted H$_2$S;

(c) combusting said unreacted H$_2$S in said gaseous reactor effluent with an O$_2$-containing gas at rates such that said unreacted $H_2S$ is from about stoichiometric to about a 5% excess relative to said $O_2$ in accordance with the reaction $$3 H_2S + 3 O_2 \rightarrow 2 SO_2 + 2 H_2O \qquad (II)$$

to convert said $H_2S$ to $SO_2$, and thereby produce a combustion gas containing $SO_2$ and $H_2O$; and (d) passing said combustion gas through an $SO_2$ absorber to recover substantially all $SO_2$ from said combustion gas, thereby leaving a tail gas substantially free of $H_2S$ and $SO_2$, and recycling all of said $SO_2$ thus recovered to said continuous-flow reactor.

2. A process in accordance with claim 1 in which said $SO_2$ contacted with said gas containing at least about 20 mole percent $H_2S$ in (b) is liquid-phase $SO_2$, said $SO_2$ recovered in (d) is a solution of $SO_2$ in an organic solvent, and (d) comprises recycling said $SO_2$ solution to said continuous-flow reactor.

3. A process in accordance with claim 2 in which said $SO_2$ solution further contains a catalytic amount of a dissolved organic catalyst that is substantially insoluble in liquid sulfur, and (d) comprises absorbing said $SO_2$ from said combustion gas into a solution of said dissolved organic catalyst in said organic solvent and recycling all of said solution containing $SO_2$ thus absorbed to said continuous-flow reactor as the liquid-phase $SO_2$ feed thereto.

4. A process in accordance with claim 3 in which said dissolved organic catalyst is a ring-nitrogen-containing heterocyclic aromatic compound.

5. A process in accordance with claim 3 in which said solvent with said dissolved organic catalyst leaving said continuous-flow reactor is separated from water produced by the reaction set forth in step (b) in claim 1 in a solvent stripper, and thus separated is recycled to said $SO_2$ absorber.

6. A process in accordance with claim 3 in which water produced by the reaction set forth in step (c) in claim 1 and contained in said combustion gas is condensed in said $SO_2$ absorber, recycled to said continuous-flow reactor together with said solvent and said dissolved organic catalyst, and said water produced by the reactions set forth in steps (b) and (c) in claim 1 are separated from said solvent in said solvent stripper.

7. A process in accordance with claim 3 in which said solvent is a nonaqueous, water-miscible organic solvent, and (d) further comprises feeding water to the top of said $SO_2$ absorber to absorb any of said solvent present in said tail gas.

8. A process in accordance with claim 3 further comprising separating said solvent and said dissolved organic catalyst from said liquid sulfur produced in said continuous-flow reactor and recycling said solvent thus separated to said $SO_2$ absorber.

9. A process in accordance with claim 3 in which said continuous-flow reactor is arranged to cause said gas containing at least about 20 mole percent $H_2S$ and said liquid-phase $SO_2$ to flow cocurrently therethrough, and said continuous-flow reactor is a packed column to cause turbulent gas-liquid contact therein.

10. A process in accordance with claim 9 in which said continuous-flow reactor is arranged, and gas and liquid feed rates thereto are selected, to provide a liquid-phase residence time for gas-liquid contact therein of from about 0.5 second to about 30 seconds.

11. A process in accordance with claim 9 in which said continuous-flow reactor is arranged, and gas and liquid feed rates thereto are selected, to provide a liquid-phase residence time for gas-liquid contact therein of from about 1 second to about 10 seconds.

12. A process in accordance with claim 3 in which said solvent is a member selected from the group consisting of ethers of ethylene glycol, diethylene glycol, triethylene glycol, tetraethylene glycol, propylene glycol, dipropylene glycol, tripropylene glycol, and tetrapropylene glycol.

13. A process in accordance with claim 3 in which said solvent is a member selected from the group consisting of monomethyl, dimethyl, monoethyl, and diethyl ethers of ethylene glycol, diethylene glycol, triethylene glycol, tetraethylene glycol, propylene glycol, dipropylene glycol, tripropylene glycol, and tetrapropylene glycol.

14. A process in accordance with claim 3 in which said solvent is a member selected from the group consisting of monomethyl and dimethyl ethers of diethylene glycol, triethylene glycol, propylene glycol, dipropylene glycol, and tripropylene glycol.

15. A process in accordance with claim 3 in which said solvent is diethylene glycol monomethyl ether.

16. A process in accordance with claim 3 in which said dissolved organic catalyst is a member selected from the group consisting of pyridine and isoquinoline, optionally substituted at one or more sites other than carbon atoms adjacent to the ring nitrogen with a member selected from the group consisting of hydroxyl, hydroxyalkyl, acetamido, acetamidoalkyl, acetyl, acetylalkyl, acetyloxy, acetyloxyalkyl, alkoxy, alkoxyalkyl, amino, alkylamino, and aminoalkyl.

17. A process in accordance with claim 3 in which said dissolved organic catalyst is a member selected from the group consisting of pyridine and isoquinoline, substituted at a site other than a carbon atom adjacent to the ring nitrogen with a member selected from the group consisting of hydroxyl, hydroxymethyl, acetamido, acetamidomethyl, acetyl, acetylmethyl, acetyloxy, and acetyloxymethyl.

18. A process in accordance with claim 3 in which said dissolved organic catalyst is pyridine substituted at a site other than a carbon atom adjacent to the ring nitrogen with a member selected from the group consisting of hydroxymethyl, acetamido, acetamidomethyl, acetyl, acetylmethyl, acetyloxy, and acetyloxymethyl.

19. A process in accordance with claim 3 in which said dissolved organic catalyst is 3-(hydroxymethyl)pyridine.

20. A process in accordance with claim 3 in which said dissolved organic catalyst is 3-(hydroxymethyl)pyridine and said solvent is diethylene glycol monomethyl ether.

21. A process in accordance with claim 11 in which said sour gas mixture contains at least about 0.01 mole percent $H_2S$, and said gas mixture drawn from said solvent stripper contains at least about 25 mole percent $H_2S$.

22. A process in accordance with claim 1 further comprising separating said solvent and said dissolved organic catalyst from said liquid sulfur produced in said continuous-flow reactor and recycling said solvent thus separated to said $H_2S$ absorber.

23. A process in accordance with claim 22 comprising recycling said solvent thus separated to said $H_2S$ absorber through said solvent stripper to remove dissolved $H_2S$ and water from said solvent before passing said solvent to said $H_2S$ absorber.

* * * * *

UNITED STATES PATENT AND TRADEMARK OFFICE
CERTIFICATE OF CORRECTION

PATENT NO. : 5,928,620
DATED : July 27, 1999
INVENTOR(S) : Scott Lynn

It is certified that error appears in the above-identified patent and that said Letters Patent is hereby corrected as shown below:

<u>Claim 1, Column 10,</u>
Line 53: before "gas" change "$O_2$" to -- the --.

Signed and Sealed this

Third Day of July, 2001

*Attest:*

*Attesting Officer*

NICHOLAS P. GODICI
*Acting Director of the United States Patent and Trademark Office*